Jan. 28, 1936.     T. KORLING     2,029,238
CAMERA MECHANISM
Filed June 14, 1933     4 Sheets-Sheet 1
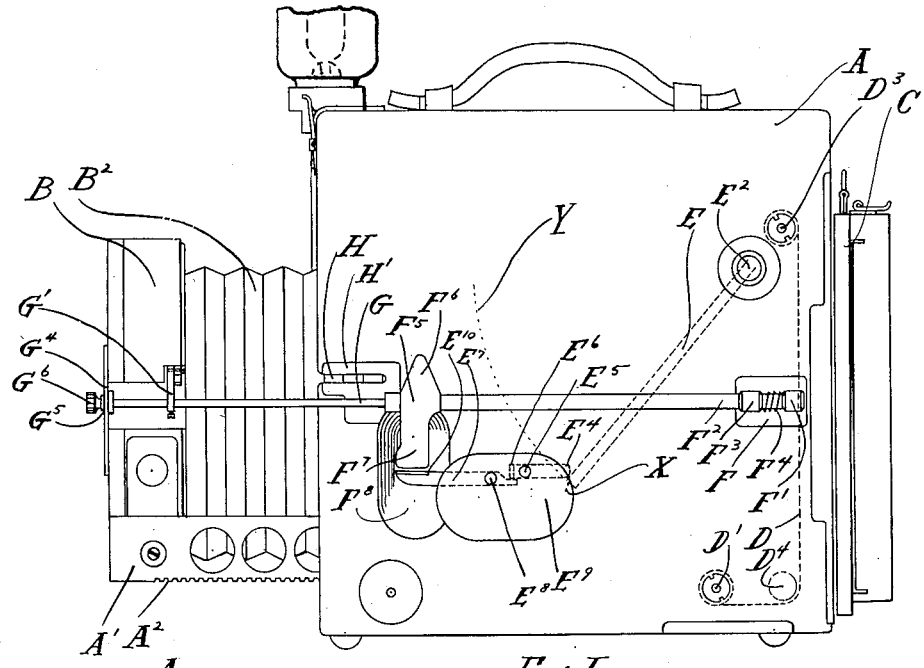
Fig I
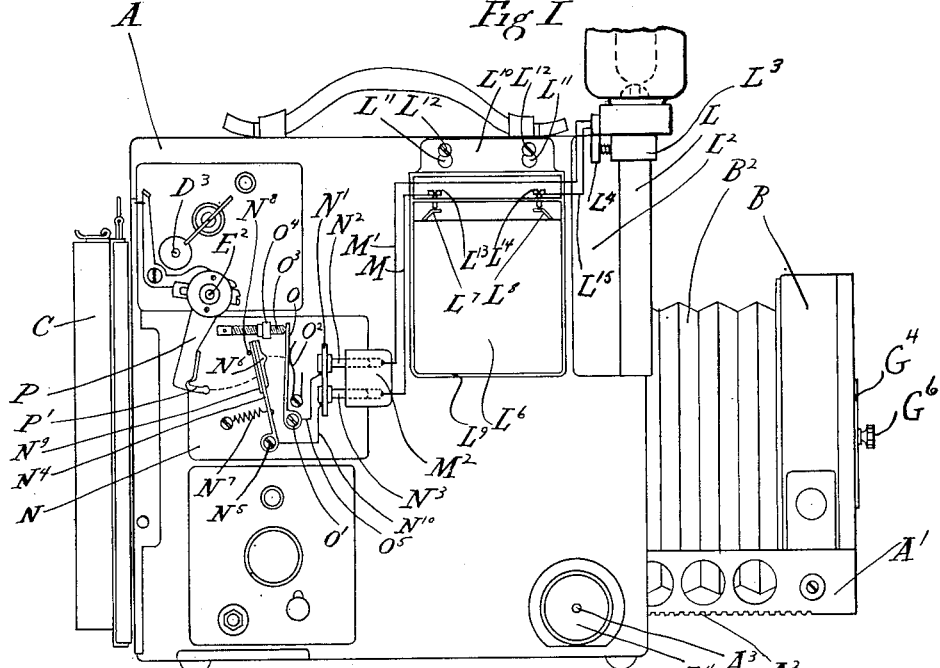
Fig II
INVENTOR
TORKEL KORLING
BY Parker & Carter
ATTORNEYS

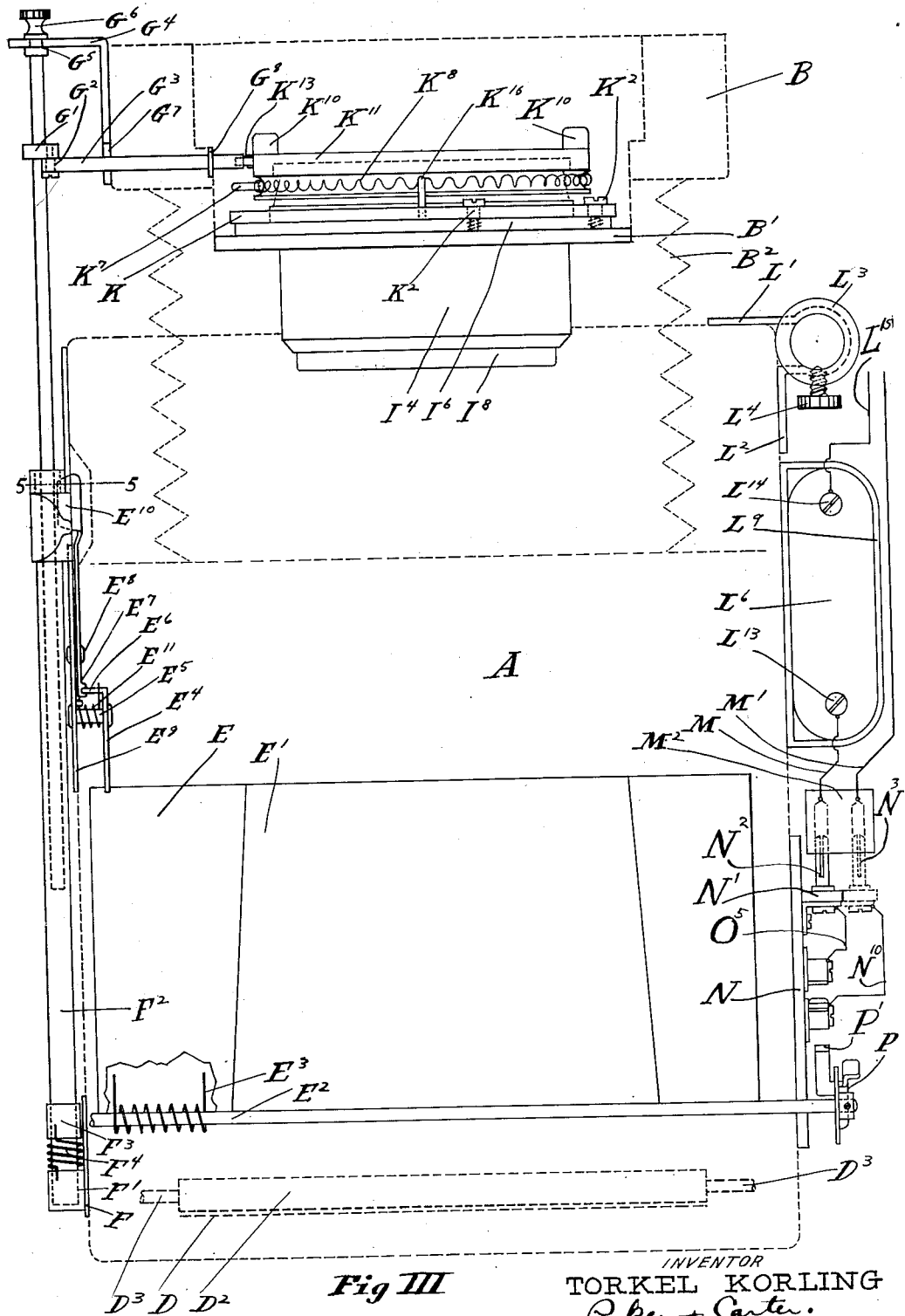

Jan. 28, 1936.  T. KORLING  2,029,238
CAMERA MECHANISM
Filed June 14, 1933   4 Sheets-Sheet 3
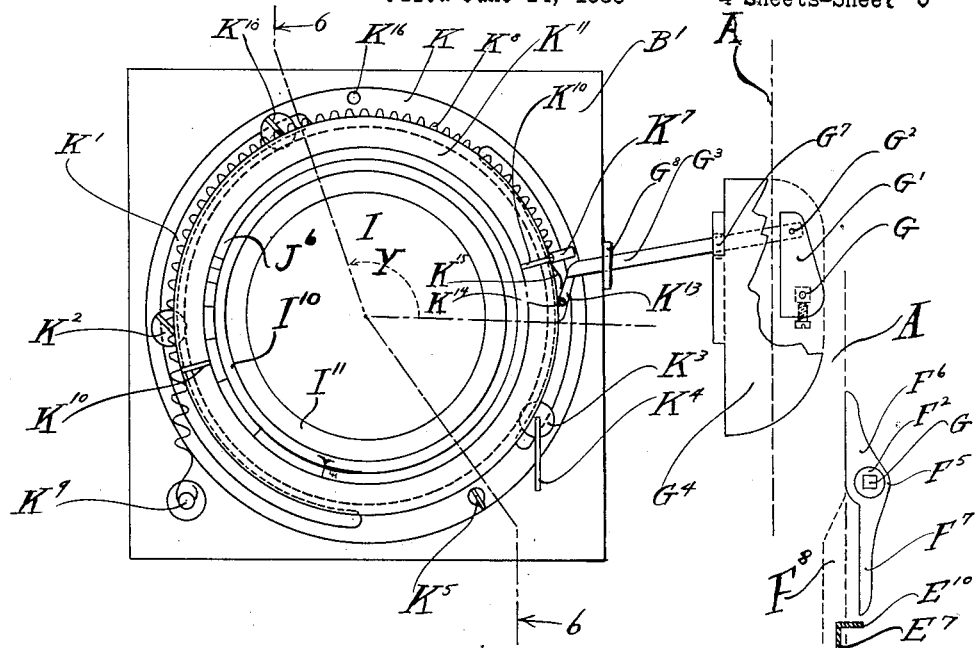
Fig. IV
Fig. V
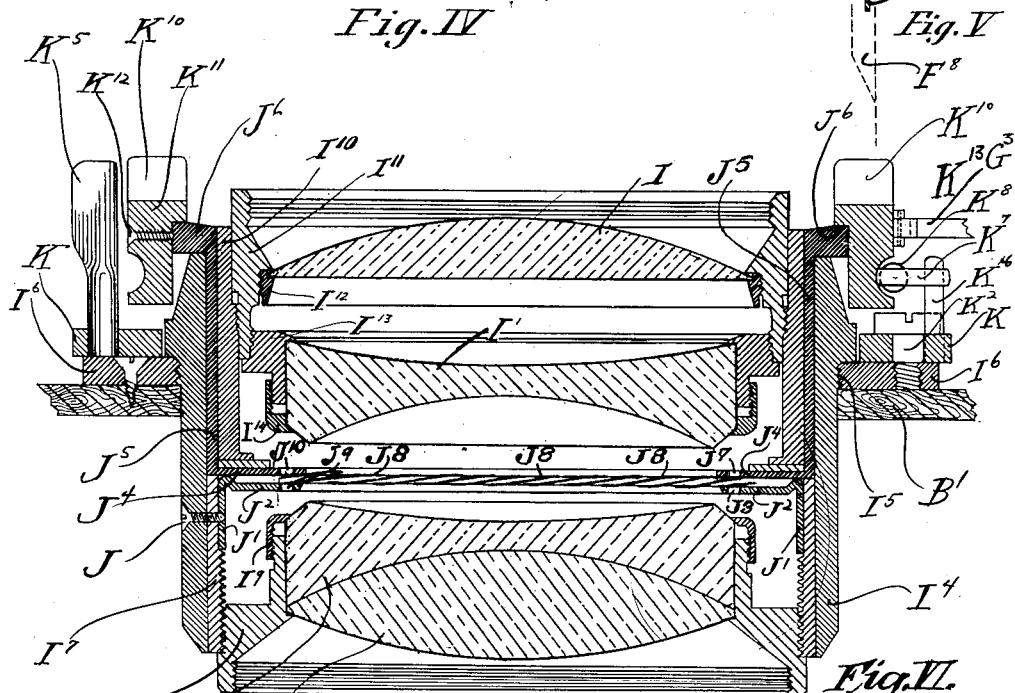
Fig. VI.
Fig. VII.
Fig. VIII
INVENTOR
TORKEL KORLING
BY Parker & Carter
ATTORNEYS

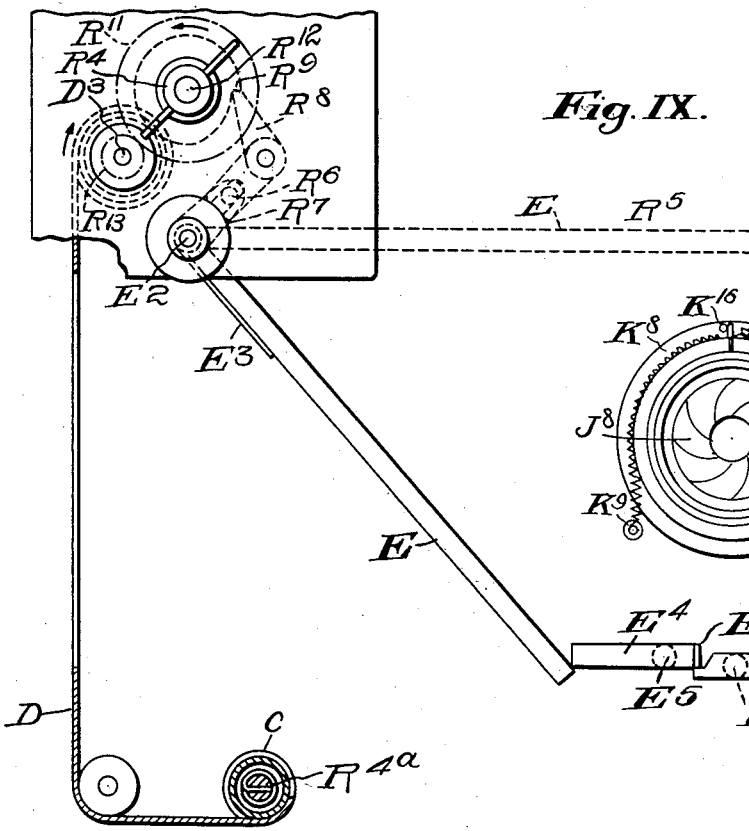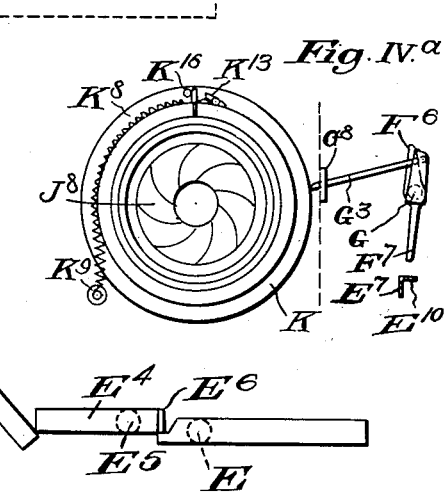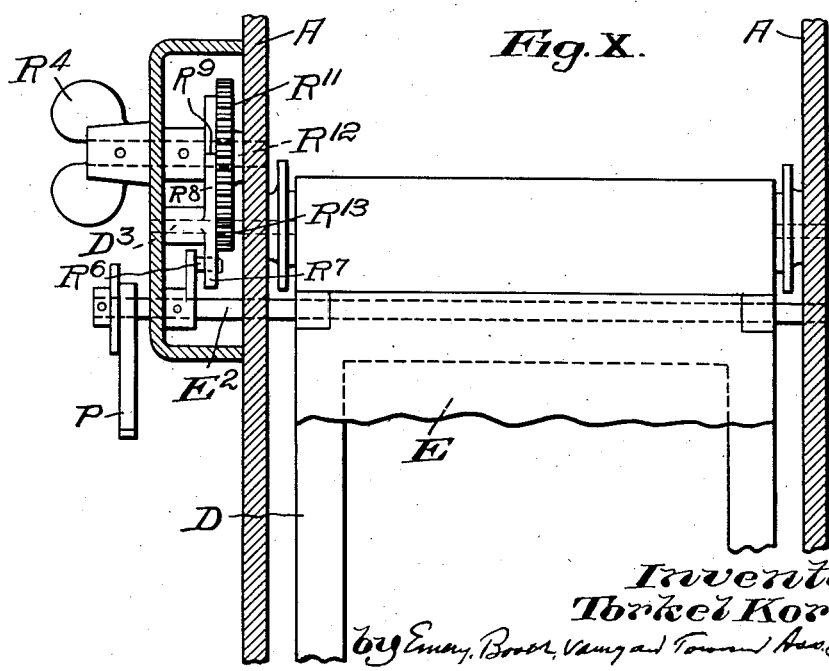

Patented Jan. 28, 1936

2,029,238

UNITED STATES PATENT OFFICE 2,029,238

CAMERA MECHANISM

Torkel Korling, Chicago, Ill., assignor to The Folmer Graflex Corporation, Rochester, N. Y., a corporation of Delaware Application June 14, 1933, Serial No. 675,658

22 Claims. (Cl. 95—42)

This invention relates to a photographic camera and has for one object to provide means for controlling the diaphragm opening in relation to the shutter movement.

It has for another object to provide an automatic mechanism joined to or associated with the shutter operating mechanism, whereby the diaphragm may be retained in an open position until just before the moment of exposure and whereby it is automatically moved to a predetermined, more nearly closed, position so that focusing may be done with an open diaphragm and the exposure effected with a relatively more nearly closed diaphragm. Another object is to provide, with a shutter and diaphragm mechanism of the type indicated, automatic means for operating a light at a suitable time for exposure. Another object is to provide automatic means whereby the diaphragm is adjusted, the shutter operated and a light source energized, all in predetermined sequence.

Other objects will appear from time to time in the specification and claims.

The invention is illustrated more or less diagrammatically in the accompanying drawings, wherein:—

Figure 1 is an elevation showing one side of a camera to which my mechanism has been attached;

Figure 2 is a similar view, showing the opposite side of the camera;

Figure 3 is a diagrammatic plan view, showing the camera diagrammatically and my shutter and diaphragm mechanism in full lines;

Figure 4 is a front elevation of the lens board and lens assembly;

Fig. 4a is a view similar to Fig. 4, but showing certain of the parts in another position.

Figure 5 is a sectional detail, taken at line 5—5 of Figure 3, showing portions of the shutter operating mechanism in full lines and in section, with the associated parts of the camera indicated diagrammatically;

Figure 6 is a section throughout the lens and lens mounting on an enlarged scale, taken generally at line 6—6 of Figure 4, with some of the parts in a modified position;

Figure 7 is a plan view, showing one of the iris or diaphragm members;

Figure 8 is an elevation of the same member.

Fig. 9 is an enlarged view of a portion of Fig. 2, showing means for winding a certain shutter, such as may be used in the camera herein disclosed; and Fig. 10 is a section on the line 10—10 of Fig. 9.

Like parts are designated by like characters throughout the specification and drawings.

While the invention may be applied to many types of camera, one important application is in connection with a reflex camera and it is so illustrated. Only so much of this camera as is necessary to explain the invention will be shown.

A indicates a box which forms generally the body of the camera. A rack portion $A^1$ provided with a rack $A^2$ is movably mounted within the camera. A pinion, not shown, engages the rack and serves to move it in and out. The pinion is mounted upon a shaft $A^3$ upon which is fixed an operating wheel $A^4$ which may be knurled or otherwise arranged for convenience of operation.

Fixed at the outer end of the rack members $A^1$ is a lens-supporting assembly B, within which is preferably removably mounted a lens board $B^1$ upon and within which is mounted a lens assembly which will be described below. A flexible bellows $B^2$ connects the lens with the body of the camera and serves to prevent light from entering the camera except through the lens.

The camera may be arranged to accommodate or use any form of sensitive material and as shown a plate holding assembly C is indicated diagrammatically. The type of plate holder or other holder for the sensitive material forms no particular part of the present invention, which may be applied to a camera adapted for use with plates, roll film, cut film or any other desired sensitive material.

While the invention may be applied to a camera having any desired type of shutter, for example, a "between the lens" shutter or a focal plane shutter, or any other type of shutter, it is illustrated here in connection with a focal plane shutter. The details of this shutter and its particular method of operation form no essential part of the present invention and it is illustrated only diagrammatically. D is the curtain of the shutter. It is positioned at one end upon a roller mounted on a shaft $D^1$ and at its other end upon a roller $D^2$ mounted on a shaft $D^3$. It may be positioned about an idler roller $D^4$. Suitable springs, adjusting and release mechanisms may be applied to control the opening and the speed of movement and the time of movement of the curtain.

In reflex cameras it is customary to have a mirror by means of which the image entering the lens during focusing may be reflected upwardly to a suitable point where it may be properly seen and studied by the user. In the camera to which the invention is applied in the form here illustrated, E is a mirror frame carrying a mirror E¹. The frame and mirror are mounted on a shaft E² which, by means of a spring E³, or by any other suitable mechanism, is moved out of the path of the entering rays to permit the exposure to be made. A catch or latch member E⁴ engages the mirror frame as shown in dotted lines in Figure 1 and as shown in full lines in Figure 3. It is positioned on a bearing stud E⁵ and is provided at one end with a laterally bent portion E⁶ which contacts one end of an operating lever E⁷. This lever is pivoted as at E⁸ on a member which is itself secured to a bearing plate E⁹ which also carries the bearing member E⁵. At its opposite end the operating lever E⁷ is provided with a laterally bent portion E¹⁰ which extends out of the camera and to a place where it may be conveniently reached and operated by the user of the camera. A spring E¹¹ is positioned about the member E⁵ and normally depresses the laterally bent end E⁶ and holds the parts in the engaging position as shown in Figures 1 and 3, to prevent movement of the mirror. When the portion E¹⁰ is depressed the lever E⁴ is rotated clockwise, as shown in Figure 1, and slips off the mirror frame E along the arc indicated at X in Figure 1, thus freeing the mirror and permitting the spring E³ to swing it upwardly along the arc marked Y in Figure 1, out of the path of the image entering the lens so that the image may fall upon the sensitive material of the plate or film. When this operation takes place the focal plane shutter will be operated or will be standing open, as desired. For many purposes in connection with the use of my device, the focal plane curtain will be held in full open position and the mirror acts as a shutter, permitting the exposure as soon as it swings up. The shutter curtain may be closed instantly thereafter, if desired.

It is universally recognized that focusing can be most easily done when the diaphragm is wide open so as to admit a maximum of possible light. It is also well recognized that the depth of focus is reduced when the diaphragm is wide open. It is desirable, therefore, to focus with a wide open diaphragm but it is also desirable to make the exposure with the diaphragm in a much more nearly closed position. My invention provides an automatic means whereby, just before the exposure is made, the diaphragm is automatically and, as a part of the shutter-tripping operation, moved to a predetermined relatively closed position, so that focusing may take place with a wide open diaphragm and the exposure, without any further manipulation, except the tripping of the shutter mechanism, automatically takes place and at a reduced diaphragm opening. I shall now describe the mechanism for accomplishing this.

F is a plate or other attaching member mounted upon the camera. F¹ is a socket or bearing portion fastened to the plate F. F² is a rounded tube journaled in the socket F¹ and having fixed upon it a collar F³. A spring F⁴ is positioned about the member F² and is fixed to the socket F¹ and the collar F³. This spring tends to rotate the member F² in a counter clockwise direction from the position shown in Figure 5. In other words, it holds the parts in the position shown in that figure and resists movement in a clockwise direction. Fixed on the member F² is an operating lever F⁵ which has an upper stop portion F⁶ arranged, when free to do so, to lie against the side of the camera in the position shown in Figures 1 and 5, and to limit the rotation of the parts under the influence of the spring F⁴. F⁷ is the lower portion of the operating lever F⁵ and as shown it extends close to the laterally bent portion E¹⁰ of the lever E⁷. The side of the camera is preferably indented or provided with a depression F⁸, opposite these two parts, so as to provide clearance for their movement and to avoid the necessity of setting them way out from the side of the camera to permit movement. The member F² is provided throughout the major portion of its length with a squared or other angular-section hollow portion. In the form shown it is squared and within it there is slidably mounted a squared rod G, which is moved in and out as the bellows is moved in and out. The rod G carries adjacent its outer end a lever arm G¹ to which is pivoted as at G² a latch member G³. Mounted on the lens supporting assembly or frame B is a bearing plate G⁴, through which the outer end of the rod G passes as at G⁵ and in which it is retained by a nut G⁶. The latch G³ is guided in a member G⁷ which is preferably formed as an extension of the plate G⁴ and it is further guided in a second guiding member G⁸ mounted upon, or formed as a part of, the member B, as indicated in Figures 3 and 4.

To permit the camera to be folded so that the outer surface of the lens housing assembly B may lie flush with the camera box, one side of the camera box or frame is slotted as at H, shown in Figure 1. About the slot a reinforcing plate H¹ may be positioned. When the camera is moved to the closed position the latch member G³ passes through and lies within the slot H.

My invention may be applied to any type of lens having a diaphragm arrangement associated with it. The diaphragm may be of almost any type. The lens illustrated herewith is formed of four glass elements I, I¹, I² and I³. Their number, shape, arrangement and mounting form no essential part of this invention. A barrel I⁴ serves as the main lens mount. It is threaded as at I⁵ and screwed into a ring I⁶ which is fastened by screws or otherwise to the lens board B¹. Within the barrel I⁴ is fixed an interiorly threaded ring or short barrel portion I⁷ which carries a lens mount I⁸ in which the elements I², I³, which as here shown are cemented together, are received. A retaining ring I⁹ holds them in position upon the member I⁸. A second ring or barrel portion I¹⁰ is mounted in the opposite end of the barrel I⁴ and it has threadedly positioned in it a lens carrying ring I¹¹ which, in cooperation with a holding ring I¹² holds the lens element I. Threadedly supported also upon the ring I¹¹ is a lens ring I¹³ which, in cooperation with a ring I¹⁴, supports the lens element I¹.

Fixed with relation to the lens barrel and here held in place by a screw J is a diaphragm supporting ring J¹ which has an inwardly projecting flange J². A plurality of perforations J³ is provided in the flange J². A second and cooperating diaphragm ring J⁴ is provided within the barrel and it may have one or more upwardly extending members J⁵ which are discontinuous and are in effect upwardly extending arms. They extend beyond the lens barrel and are joined to a diaphragm setting ring J⁶. This ring may be rotated about the barrel and by reason of its connection through the arms J⁵ to the secondary ring J⁴ it rotates that ring to provide diaphragm adjustment in a manner which will be described below. The arms or members J⁵ lie within the slots or other clearances formed or provided by the member I¹⁰. The ring J⁴ is provided with a plurality of slots $J^7$ and the number of slots $J^7$ is equal to the number of perforations $J^3$. There is provided a plurality of diaphragm members $J^8$. One of these members is shown diagrammatically in Figures 7 and 8. As there shown each member is provided with a downwardly projecting pin $J^9$ and an upwardly projecting pin $J^{10}$. The downwardly projecting pin fits within one of the perforations $J^3$ and the upwardly projecting pin fits within one of the slots $J^7$. By reason of this arrangement relative movement of the rings $J^2$ and $J^4$ caused by rotation of the diaphragm setting ring $J^6$, causes a pivotal movement of the diaphragm leaves or members $J^8$ and so increases or decreases the size of the opening, depending upon the direction of rotation.

The diaphragm arrangement just described is merely one of the many such diaphragm arrangements. My invention is not limited to any particular diaphragm construction. Ordinarily whatever the diaphragm arrangement, some means is provided for adjusting the size of the diaphragm opening and that means will include a setting member outside of the lens barrel, in this case it is the ring $J^6$, but it might take many other forms, and my diaphragm setting mechanism, and particularly my automatic setting mechanism, is arranged to cooperate with this outwardly projecting diaphragm ring and it is to that ring or to some other equivalent diaphragm setting member that my automatic mechanism is attached, so that by the automatic movement of this diaphragm setting member I am enabled to set the diaphragm and adjust and control the size of the diaphragm opening.

Movably positioned upon the ring $I^6$ is a diaphragm setting ring K. It is slotted as at $K^1$ and held in position by means of guide screws $K^2$ $K^2$ and by a locking lug $K^3$ which has an operating handle portion $K^4$. By means of the lug $K^3$ the ring may be locked in any position of diaphragm adjustment within its limit of movement. It carries a pin or handle $K^5$ by means of which an operator may take hold of it to rotate it. Fixed in the ring $K^{11}$ is a pin $K^7$, to which one end of a tension spring $K^8$ is attached. At its other end the spring is fastened to a pin or screw $K^9$ which may be, as in the present case, fixed in the lens board $B^1$. There may be fastened on the diaphragm $K^{11}$ one or more upwardly extending vanes or projecting members $K^{10}$. In the form here shown they are formed integrally with the ring $K^{11}$, which surrounds the diaphragm ring $J^6$ and this ring $K^{11}$ is fastened to the diaphragm ring by one or more screws $K^{12}$. A dog $K^{13}$ is pivoted to the ring $K^{11}$ as at $K^{14}$ and is normally held in the position shown in Figure 4 by a spring $K^{15}$. The dog is thus held in position to engage the latch member $G^3$ as shown in Figure 4. If the ring carrying the dog has been moved in a counter clockwise direction out of engagement with the latch $G^3$, and is thereafter returned to or beyond the dog by movement in a clockwise direction, the dog will contact the latch and as the movement is continued will be depressed against the spring $K^{15}$ and will yield sufficiently to pass under the latch member $G^3$ and will then spring into engaging position so that when the parts are released the latch and the dog will engage each other and will hold the parts in the position generally indicated in Figure 4. $K^{16}$ is a stop pin on the ring K.

It is frequently advantageous to combine with my camera and to synchronize with the exposure, a light source such as a flash light or flash bulb or any other means of producing a light and preferably an intense light of short duration. To accomplish this I have provided a mechanism preferably mounted upon the camera and operated in a predetermined and controlled sequence with the shutter operation and the diaphragm operation. For this purpose I have provided a socket member L which as here shown is made of sheet metal provided with side portions $L^1$ and $L^2$ which are attached to the box of the camera. A collar $L^3$ is placed at the upper end of the socket portion L and a set screw $L^4$ is mounted in it and arranged to be moved in or out to engage a standard $L^5$ which may be removably mounted in the socket. The standard may carry any sort of electric light bulb or flash gun or other light source $L^{20}$ which may be ignited or energized by an electrical charge. The electric current for this purpose may be furnished from any source. It is often convenient to have the current source attached to the camera and for that reason I have shown a battery $L^6$ having contact members or poles $L^7$, $L^8$. For purposes of convenience the battery may be mounted in a housing $L^9$ which has an upward extension $L^{10}$ slotted as at $L^{11}$, $L^{11}$ to engage screws or pins $L^{12}$ in the camera box. Mounted within the housing $L^9$ is a plurality of contact members $L^{13}$ $L^{14}$, adapted to make contact, respectively, with the battery contact members $L^7$ $L^8$. The housing $L^9$ may be provided with any suitable covering or casing. As shown in Figure 2 this casing has been removed to show the interior of the housing and the battery and battery connections.

A wire M is connected with the contact $L^{13}$ and a wire $M^1$ passes through the housing and may pass through it uninterrupted as shown in Figure 2. The two wires are connected each to one pole of a removable plug member $M^2$.

A contact making assembly is mounted on the side of the camera box and may be carried upon a base N. An outwardly extending member $N^1$ carries contact pins $N^2$ $N^3$ arranged to be received in the plug $M^2$ as shown in Figures 2 and 3. A movable switch lever $N^4$ is pivoted upon the base N as at $N^5$, is provided with a contact point $N^6$ and is held normally away from the contact and in the position shown in Figure 2 by a spring $N^7$. A stop pin $N^8$ limits its counter clockwise movement. It is preferably provided with insulation $N^9$ upon one side, as shown in Figure 2. $N^{10}$ is a wire or other conductor leading from the switch member $N^4$ to the contact pin $N^3$.

A second switch or contact member O is pivoted upon the base N as at $O^1$. A spring $O^2$ tends to move it normally in a counter clockwise direction against an adjustable stop $O^3$ which is adjustably mounted in a support $O^4$ fixed upon the base N. A wire or other conductor $O^5$ connects the switch member O with the contact pin $N^2$.

Mounted upon the outer end of the mirror shaft $E^2$ is an arm P which has a laterally bent contact portion $P^1$ arranged to move along the arc indicated in dotted lines in Figure 2, when the mirror shaft moves, and to contact the insulation $N^9$ on the switch arm $N^4$. As the arm P moves further in a counter clockwise direction, it swings the switch lever $N^4$ in a clockwise direction along the shorter arc shown in Figure 2 and brings its contact portion $N^6$ into contact with the second switch arm O to complete the circuit.

If my device were mounted upon another type of camera certain details of the contact-making mechanism might be different but there will always be some member actuated by movement of the mirror which will be associated with my contact making mechanism so that the contact is made in response to movement of the mirror mechanism. The mechanism here illustrated is associated with a well known type of reflex camera.

It will be realized that whereas I have herewith shown and described a practical operative device, nevertheless many changes might be made in the size, shape, number and disposition of parts, without departing from the spirit of my invention and I wish, therefore, that my showing be taken as in a sense diagrammatic.

In particular, almost any form of light may be used. I have shown in Figure 1 one of the leads or conductors $M^1$ and a second lead $L^{15}$ extending from the battery box upward. They may, of course, be joined in a single cable and may be attached in any way to a flash gun or to any form of light $L^{20}$. A convenient and useful form is a flash bulb. The light form shown is merely meant to be representative of any desired light source because the invention is not limited in its use to any particular form.

While I have shown a battery box and while for many purposes this is convenient, sometimes it is desirable to actuate or energize the light from some other source of current, such for example as a house circuit, and the circuit-making mechanism shown is equally applicable to this purpose. The battery box will be eliminated and the leads $M^1$ and $M^2$, or one of them, instead of passing to the battery box, will be connected with the house circuit and thence to the light. Thus my mechanism may be used with any source of electric energy, whether or not it is connected to or carried with the camera.

In the drawings, for purposes of clarity, I have shown in Figure 3 the lower member $N^3$ in dotted lines to indicate diagrammatically the location of this part which would otherwise have been obstructed by the upper member $N^2$. In Figure 6 the section through the lens is based on Figure 4, but with the parts moved somewhat from the position they occupy in Figure 4. The arc Y indicates the position and degree of this movement.

The lens shown herewith is of the sunken mount type and it is shown merely because such mountings are often used in reflex cameras. Obviously my diaphragm setting device and the other features shown herewith are in no way limited to attachment to or used in connection with any particular lens or lens mount and my invention can be applied equally well to almost any type of lens or lens mount, irrespective of their construction.

The use and operation of my invention are as follows:

Before the exposure is made the camera is to be focused and in a reflex camera of the type shown the focusing is accomplished by the use of the mirror, the image entering through the lens, striking the mirror, being reflected upward from it upon a ground glass not shown. The user can move the lens in and out by means of the wheel or knob $A^4$ and so can focus the camera. During this movement the mirror remains stationary. The mirror may be used to act as a shutter. When it is in the dotted line position of Figure 1 it prevents any light from going past it in the direction of the focal plane shutter and thus even if the latter is open, it prevents the making of an exposure. For most purposes I prefer to have the focal plane shutter in the open position and thus the mirror is the only means obstructing the light and preventing its falling immediately upon the film or plate. If the mirror is raised from its dotted line position of Figure 1, light can fall upon the plate so long as the focal plane shutter remains open. Generally in reflex cameras, and particularly in the camera here shown, there is a connection in the camera, the details of which form no essential part of the present invention, by means of which shutter movement is related to mirror movement. While for the purposes herein described, I may use any suitable means, I have herein represented in Figs. 9 and 10 certain operatively connecting means which may be somewhat similar to what is shown in the United States patent to Petit and Hineline, No. 1,980,546, November 13, 1934, and which details of connection I do not claim.

In said Figs. 9 and 10, the parts which are also shown in the other figures of the drawings have the same reference characters applied thereto.

In Fig. 9 is shown thumb nut $R^4$ (shown also in Fig. 2). It is used to wind the shutter in the direction of the arrow on pinion shaft $D^3$ against a spring $R^4a$ in the curtain roller. When the mirror E is released by the lever $E^4$ the spring $E^3$ moves the mirror up into the dotted position shown at $R^5$. This will cause a pin $R^6$ on arm $R^7$ to engage a slot in the lever $R^8$, thereby moving said lever $R^8$ out of engagement with the notch $R^9$ of the cam $R^{10}$, thus allowing the curtain or shutter to close in the direction of the arrow in Fig. 9. In Fig. 10, the thumb nut $R^4$ and the gear $R^{11}$ are shown as fast on a short shaft $R^{12}$. Said gear $R^{11}$ meshes with a pinion $R^{13}$ on the shaft $D^3$ of the shutter or curtain. These connections are shown only by way of example. In the present case when the mirror moves up the shutter is operated to be closed. This movement is adjustable so that the shutter curtain may be automatically tripped to be closed at any desired state in the movement of the mirror. Ordinarily, however, the shutter curtain will be tripped only after the mirror has moved past the point where it obstructs the light passing through the lens. Thus as shown herewith, when an exposure is to be made, the mirror is in the down or closed position and the shutter is open. If the mirror is released it flies upward under the influence of its spring, permitting an exposure and, at the proper stage, operating the shutter so that the curtain moves to the closed position.

During the focusing it is desirable to have the diaphragm as wide open as possible but for most purposes of exposure it is desirable to have the diaphragm more nearly closed, and it is one of the objects of my invention to provide an automatic means whereby the diaphragm may be open for focusing and may be automatically stopped down to a predetermined opening just before the exposure is made.

The diaphragm opening is set by movement of the ring K. The locking lug $K^3$ is rotated to the unlocked position and the ring K is moved and carries with it the diaphragm ring $J^6$ and the ring $K^{11}$. For this purpose the three move together. When the diaphragm has been set at the desired point the locking lug $K^3$ is locked.

Except when the camera is in use the latch $G^3$ does not engage the dog $K^{13}$ and the spring $K^8$ is then free to move the diaphragm ring $J^6$ and the setting ring $K^{11}$ in a counter clockwise direction. This movement is limited by contact of the stop pin $K^7$ in the ring $K^{11}$ with the stop pin $K^{16}$ in the ring K. The sectional view of Figure 6 is taken with the parts in that position.

In Figure 4 it will be noticed that the ring $J^6$ is provided with a number of markings and that the ring $I^{10}$ has an index mark upon it. The markings on the ring $J^6$ may be according to any desired scale of diaphragm openings and the index point on the ring $I^{10}$ indicates the particular setting of the diaphragm. When the diaphragm is to be set the pin $K^7$ is in contact with the pin $K^{16}$. The user then takes hold of the pin $K^5$ and moves the ring assembly, including the rings K, $K^{11}$ and $J^6$, until the suitable marking on the movable ring $J^6$ is brought opposite the index on the stationary ring $I^{10}$. The diaphragm has thus been set at the desired point and is stopped down or opened up as the user desires. Ordinarily it will be set at something less than the maximum diaphragm opening because it will ordinarily be preferable to make the exposure at less than maximum opening. In order now to open the diaphragm to its maximum for focusing, after the setting above described, the user will take hold of the two wing or handle members $K^{10}$ and will rotate the ring $K^{11}$, carrying with it only the diaphragm ring $J^6$, in a clockwise direction, until the dog $K^{13}$ slips under the latch $G^3$. The parts then assume the position shown in Figure 4, the latch engaging the dog and holding the parts stationary. In this position the diaphragm is at maximum opening so that it permits a maximum of light to strike upon the mirror E, to be available for focusing.

With the parts in the position shown in Figures 1, 3 and 4 and as described in the preceding paragraph, the focal plane shutter will be in the full open position and only the mirror prevents an exposure. To make an exposure the user moves the lever $F^5$ in a clockwise direction as indicated in Figure 5, by bearing against the portion $F^7$ of that lever. This rotates the shaft assembly $F^2$, G, and moves the latch $G^3$ out of engagement with the dog $K^{13}$. The spring $K^8$ is thus free to move the diaphragm ring back until the pin $K^7$ strikes the pin $K^{16}$ and thus by this movement the diaphragm is again stopped down to the predetermined point at which the ring K has been set. It is not until the lever $F^7$ has been moved as described that the exposure lever $E^{10}$ can be reached by the operator and thus, practically as one movement, the lever $F^7$ is moved to free the diaphragm adjusting mechanism and the finger of the operator is further depressed to depress the exposure lever $E^7$, $E^{10}$. As this lever is rotated downwardly it is shorter and bears against the portion $E^6$ of the lever $E^4$ and frees the mirror so that the latter may swing upwardly under the influence of its spring $E^3$. As this movement commences light may for the first time pass beyond the mirror through the opening in the focal plane shutter curtain and strike the plate or film. At a predetermined point in the movement of the mirror the connection between the mirror shaft and the focal plane shutter mechanism is effective to move the latter so that the shutter is closed. This is necessary to prevent over-exposure and to protect the film or plate as soon as the exposure has been made.

Moving with the mirror shaft $E^2$ is the arm P. The parts are so timed that after the mirror has commenced its movement and before the focal plane shutter has closed and while light may thus strike upon the film or plate, the contact lever P has moved in a counter clockwise direction from the position shown in Figure 2, to strike the contact lever $N^4$ to move it into contact with the second contact lever O and to complete the electrical circuit so that a light of any desirable sort may be energized or ignited. It is not until this has taken place that the curtain mechanism is actuated to close the curtain.

Thus in the operation of this invention focusing may take place with a wide open diaphragm but an exposure cannot be made until the diaphragm has been closed. With the closing of the diaphragm practically as a continuous movement, the mirror mechanism is operated to make the exposure. The mirror mechanism completes the contact, to energize the light and only after these two operations have occurred is the focal plane shutter mechanism actuated to close the curtain and thus in effect the mirror movement is used to make the exposure, to energize the light and to close the curtain.

While this invention has been described as applied to a focal plane shutter and to a reflex camera, it is not limited to this use and it may be applied to a camera of almost any type.

While I have spoken of using the shutter curtain of the focal plane shutter in a fully open position, in which it is open at the time that the mirror moves, so that the mirror in effect acts as the shutter and so that the only movement of the curtain is the closing movement, my invention is not limited to this use. The movement of the mirror releases or trips the curtain movement and the curtain may be set to make an exposure of almost any desired duration, so that I may set the curtain, for example, at one-tenth of a second. The movement of the mirror will release the curtain mechanism after the mirror has moved out of the path of the incoming rays from the lens so that it will not obstruct them and by adjusting the adjustable stop $O^3$, the time of the contact which ignites the light may be adjusted to take place at any point in the cycle of movement of the mirror or the curtain, so that for the exposure of one-tenth of a second the light will be ignited at the proper point in the cycle to furnish the desired illumination during exposure. The spring tension of the shutter mechanism and the size of the slit in the screen may be adjusted to provide an exposure of any desired length. This mechanism is, of course, typical of focal plane shutters and generally of reflex cameras.

I have stated that my light source might be flash powder, a flash bulb or some other source of light. For some purposes it is desirable to ignite or energize a relatively slow burning flash powder or other source, and to time its ignition with respect to the shutter movement so that the exposure is made during any desired portion of the burning, the exposure itself being shorter in time than the total time of burning. Such exposures are referred to by photographers as "speed flashes". Thus I may make an exposure in which the actual time during which the shutter is open is longer or shorter than the total time of burning of the light.

From the above it will be obvious that one of the objects of the invention is to make sure that the diaphragm will be closed to the predetermined point at the time that the exposure is actually made. This might be accomplished by linking the shutter control lever, for example, the member $E^7$, directly to the diaphragm control lever, for example, the member $F^7$, so that a movement of either one would automatically compel the proper movement of the other and so that if either were moved the other would move in the proper timed relation with it. This might be done by a composite lever or by linking together the levers or in any one of a variety of ways. The present arrangement, however, is very simple and accomplishes the result without the necessity of any complicated lever or other mechanism. As shown particularly in Figure 5, the lever $F^7$ is set out beyond the lever $E^7$, $E^{10}$, so that the latter cannot be depressed until the lever $F^7$ has been moved sufficiently to make access to the lever $E^7$, $E^{10}$ possible. Thus as viewed in Figure 5, the lever $F^7$ must be moved in clockwise direction inwardly and then, and only then, is the portion $E^{10}$ of the lever $E^7$ uncovered and available so that it can be depressed. This very simple arrangement makes certain the release of the diaphragm closing mechanism before the mirror releasing lever $E^7$, $E^{10}$ can be depressed to release the mirror. The two are operated in effect by a single inwardly wiping movement of the thumb of the operator, which first moves the lever $F^7$ inwardly, thereby withdrawing the latch $G^3$ and freeing the spring $K^8$ so that it can move the diaphragm ring around to the predetermined reduced diaphragm setting and then, as the thumb of the operator descends further, it contacts the now uncovered portion $E^{10}$ of the lever $E^7$, which is depressed to free the mirror for movement and thus to initiate the full cycle of mirror, shutter operation.

I claim:

1. In a photographic device comprising a light-tight receptacle, means for receiving a piece of photo-sensitive material, said receptacle having a light beam admitting opening opposite said photo-sensitive material, and a light obstructing device between said opening and said sensitive material, means for automatically and successively reducing the cross sectional area of a light beam passing through said opening, for removing said obstructing device from the path of said beam, for increasing the illumination of the object and finally for obstructing said light beam.

2. In combination in a camera, a diaphragm, a shutter, a diaphragm adjusting mechanism adapted, when free to do so, automatically to move the diaphragm to an adjusted setting less than its maximum opening, and means for holding said diaphragm at a greater opening, means for releasing it to free it for movement to its reduced adjusted position, a movable shutter release member, the diaphragm release, means including a member overlying the shutter release member and movable transversely of the plane of movement of said shutter release to effect release of said diaphragm whereby the shutter release is inaccessible for operation and is thus protected against movement until the diaphragm release has been operated to effect release of the diaphragm.

3. In combination in a camera, a diaphragm, a shutter, a diaphragm adjusting mechanism adapted, when free to do so, automatically to move the diaphragm to an adjusted setting less than its maximum opening, and means for holding said diaphragm at a greater opening, means for releasing it to free it for movement to its reduced adjusted position, a shutter release, the diaphragm release shielding the shutter release, whereby the latter cannot be reached for movement until the diaphragm release has been moved.

4. In combination in a camera of the reflex type, a mirror movable from focusing to picture-taking position, a lens, a diaphragm, a shutter, artificial light means, and co-acting means operatively connecting in movement the mirror and the shutter and operatively connecting said mirror and the said artificial light means whereby the mirror movement effects the exposure and causes the functioning of said artificial light means.

5. In combination in a camera of the reflex type, a mirror movable from focusing to picture-taking position, a lens, a diaphragm, a shutter, artificial light means, and co-acting means operatively connecting in movement the mirror and the shutter and operatively connecting said mirror and the said artificial light means whereby the movement of the mirror from its focusing position effects the exposure and the functioning of the artificial light means.

6. In combination in a camera of the reflex type, a mirror movable from focusing to picture-taking position, a lens, a diaphragm, a shutter of the curtain type, artificial light means, and means co-acting with the mirror and operatively connecting in movement the said mirror and the said shutter and operatively connecting said mirror and the said artificial light means, whereby the movement of the mirror from its focusing position permits the making of the exposure, causes the functioning of the artificial light means, and effects the closing of the curtain shutter.

7. In combination in a camera of the reflex type, a mirror movable from focusing to picture-taking position, a lens, a diaphragm, a shutter, artificial light means, and means operatively connecting the mirror in its movement and said artificial light means whereby the said artificial light means is caused to function automatically during the movement of the mirror from its focusing position.

8. In combination in a camera of the reflex type, a mirror movable from focusing to picture-taking position, a lens, a diaphragm, a shutter, artificial light means, and means for effecting the functioning of the artificial light means at a predetermined but variable time during the movement of the mirror from its focusing position.

9. In combination in a camera of the reflex type, a mirror movable from focusing to picture-taking position, a lens, a diaphragm, a shutter, artificial light means, and means for effecting the functioning of the artificial light means at a predetermined time during the mirror movement.

10. In combination in a camera of the reflex type, a mirror movable from focusing to picture-taking position, a lens, a diaphragm, a shutter, artificial light means, means whereby a picture-taking movement causes the artificial light means to function, and means to vary the time at which said artificial light functions with relation to such picture-taking movement.

11. In a camera of the reflex type, a pivoted mirror, a lens, a diaphragm, a shutter of the curtain type, flashlight means, and means initiated by the movement of the mirror from its focusing position to cause the flashing of the light.

12. In a camera of the reflex type, a pivoted mirror, a lens, a diaphragm, a shutter of the curtain type, a flashlight means, means initiated by the movement of the mirror from its focusing position to cause the flashing of the light, and means whereby the time for flashing the light is varied with respect to the time when the mirror is released from its focusing position.

13. In a camera of the reflex type, a pivoted mirror, a lens, a diaphragm, a shutter, artificial light means, and means operatively connecting the said mirror in its movement with the diaphragm, also with the artificial light means, and also with the shutter whereby the movement of the mirror from its focusing position automatically stops down the diaphragm opening, causes the functioning of the artificial light, and closes the shutter.

14. In a camera of the reflex type, a pivoted mirror, a lens, a diaphragm, a shutter, means whereby the movement of the mirror from its focusing position automatically stops down the diaphragm opening, causes the functioning of the artificial light and closes the shutter, and means whereby the time at which the said light functions is varied with respect to the commencement of the mirror movement from its focusing position.

15. In a camera of the reflex type, a pivoted mirror, a lens, a diaphragm, a shutter, and artificial light means, and means operatively connecting the said mirror in its movement with the diaphragm, also with the artificial light means, and also with the shutter whereby the movement of the mirror from its focusing position automatically stops down the diaphragm opening, causes the functioning of the artificial light and closes the shutter, and means whereby the time at which said light flashes may be varied to any predetermined part of the shutter closing movement.

16. In a camera of the reflex type having a movable mirror, a lens, a flashlight, a diaphragm, the opening whereof is adapted to be stopped down, a shutter, and interrelated means operatively connecting in movement the mirror with the diaphragm, the flashlight and the shutter, for effecting the following sequence of movements of said parts, namely, stopping down the diaphragm opening, moving the mirror from focusing position, flashing the light, and closing the shutter.

17. In a combination according to claim 16, means to vary the time at which the light is flashed in the said sequence.

18. In a combination according to claim 16, means for varying the time during the mirror movement when the said light is flashed.

19. In a combination according to claim 16, means for varying the time of flashing the light with respect to the movement of the mirror.

20. In a camera of the reflex type having a movable mirror, a lens, a diaphragm having means whereby it may be widely opened for focusing and may be automatically stopped down to any predetermined smaller opening just before exposure is made, and a shutter, a shaft, a lever $F^5$ mounted thereon, said shaft being operatively connected to said diaphragm, a lever $E^7$ mounted in such proximity to the lever $F^5$ that continuation of the same manual movement first moves lever $F^5$ and then moves lever $E^7$, and operative connections whereby movement of lever $E^7$ releases the mirror from focusing position.

21. In a camera of the reflex type having a movable mirror, a lens, a diaphragm having means whereby it may be widely opened for focusing and may be automatically stopped down to any predetermined smaller opening just before exposure is made, a member adapted to be manually moved by the operator and itself operatively associated with said diaphragm, and a second movable member mounted in juxtaposition to said first member and operatively associated with the mirror and adapted when moved to release the same from focusing position.

22. In a camera of the reflex type having a movable mirror, a lens, a diaphragm having means whereby it may be widely opened for focusing and may be automatically stopped down to any predetermined smaller opening just before exposure is made, a member adapted to be manually moved by the operator and itself operatively associated with said diaphragm, and a second movable member mounted in juxtaposition to said first member and operatively associated with the mirror and adapted when moved to release the same from focusing position, said two members being so relatively positioned that a single manual movement operates them both in said order.

TORKEL KORLING.